United States Patent [19]

Prewo et al.

[11] 4,399,231

[45] * Aug. 16, 1983

[54] DISCONTINUOUS SILICON CARBIDE FIBER REINFORCED GLASS COMPOSITES

[75] Inventors: Karl M. Prewo, Vernon; John J. Brennan, Portland, both of Conn.

[73] Assignee: United Technologies Corporation, Hartford, Conn.

[ * ] Notice: The portion of the term of this patent subsequent to Feb. 9, 1999, has been disclaimed.

[21] Appl. No.: 345,996

[22] Filed: Feb. 5, 1982

[51] Int. Cl.$^3$ .................. C04B 35/56; C03C 3/04; C03C 3/08

[52] U.S. Cl. .................. 501/32; 501/88; 501/89; 501/95

[58] Field of Search .................. 501/88, 89, 32, 95

[56] References Cited

U.S. PATENT DOCUMENTS

| | | | |
|---|---|---|---|
| 3,161,473 | 12/1964 | Pultz | 423/348 |
| 3,386,840 | 6/1968 | Gruber | 501/88 |
| 3,509,072 | 4/1970 | Barrington et al. | 501/88 |
| 3,653,851 | 4/1972 | Gruber | 501/88 |
| 3,892,583 | 7/1974 | Winter | 501/92 |
| 4,060,424 | 11/1977 | Hofmann | 501/88 |
| 4,158,687 | 6/1979 | Yajima et al. | 501/95 |
| 4,314,852 | 2/1982 | Brennan et al. | 501/88 |
| 4,324,843 | 4/1982 | Brennan et al. | 428/697 |

*Primary Examiner*—Mark Bell
*Attorney, Agent, or Firm*—Harry J. Gwinnell

[57] ABSTRACT

Discontinuous silicon carbide fiber reinforced glass composites are disclosed having high strength, fracture toughness, and oxidative stability, even in high temperature oxidative environments. Disclosed composites include silicon carbide fiber reinforced borosilicate glass, high silica content glass, and aluminosilicate glass. Flexural strengths in excess of 20,000 psi (138 MPa) at temperatures in excess of 500° C. are attained with such composites.

8 Claims, No Drawings

DISCONTINUOUS SILICON CARBIDE FIBER REINFORCED GLASS COMPOSITES

Cross Reference to Related Applications

U.S. Patent application Ser. No. 121,081, filed Feb. 13, 1980, now U.S. Pat. No. 4,324,843 by the same inventors as the present application and commonly assigned is directed to silicon carbide fiber reinforced ceramic composites; U.S. Patent application Ser. No. 147,672, filed May 7, 1980, now U.S. Pat. No. 4,314,852 by the same inventors as the present application and commonly assigned is directed to silicon carbide fiber reinforced glass composites.

Description

1. Technical Field

The field of art to which this invention pertains is fiber reinforced composites.

2. Background Art

Because of the scarcity and increasing expense of many conventional high temperature structural metals, increased attention has focused on non-metal containing composites as replacements for conventional high temperature metal-containing meterials. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature. And while great strides have been made in raising the use temperature, for example by utilizing such composites as graphite fiber reinforced glass and alumina fiber reinforced glass, there is still much room for improvement. For example, while the graphite fiber reinforced glass composite demonstrates high levels of strength, fatigue resistance, and fracture toughness, it is also susceptible to detrimental fiber oxidation at elevated temperatures. And while composites such as alumina fiber reinforced glass are oxidatively stable at high temperatures, the overall strength and toughness levels obtainable with these composites is less than that possible with a graphite reinforced glass system, for example. Accordingly, what is needed in the art is a composite with high strength, high fracture toughness, and oxidation stability at high temperatures.

DISCLOSURE OF INVENTION

The present invention is directed to a solution to the strength, fracture toughness, and oxidation stability problems which exist with composites of the prior art and comprises discontinuous silicon carbide fiber reinforced glass composites having high strength, fracture toughness, and oxidation stability, even at elevated temperatures.

The high strength composites according to the present invention comprising the discontinuous silicon carbide fibers laid up in substantially in-plane random orientation in the glass matrix have strength and fracture toughness properties greater than that of the glass matrix even at elevated temperatures, e.g. in excess of 300° C. and even in excess of 500° C.

The foregoing, and other features and advantages of the present invention, will become more apparent from the following description.

BEST MODE FOR CARRYING OUT THE INVENTION

While any borosilicate glass which will impart the described properties can be used with the present invention, Corning 7740 (Corning Glass Works) was found particularly suitable to produce such properties. Similarly, Corning 7930 (about 96% by weight silica), obtained by leaching the boron from a borosilicate glass, and Corning 1723 are the preferred high silica content glass and aluminosilicate glass, respectively. While the borosilicate glass and the aluminosilicate glass can be used in its as received $-325$ mesh sieve form, the desired properties for the high silica content glass composites can only be satisfactorily fabricated with the glass after it has been ball-milled in propanol for more than 100 hours. It should also be noted that mixtures of the above glasses may also be used, with properties tailored accordingly.

Any silicon carbide fiber system with the requisite strength can be used, although a multi-filament silicon carbide yarn with an average filament diameter up to 50 microns is preferred and yarn with average filament diameter of 5 to 50 microns is especially preferred. Nippon Carbon Company of Japan produces such a yarn with about 250 fibers per tow and an average fiber diameter of about 10 microns. The average strength of the fiber is approximately 2000 MPa (300,000 psi), and it has a use temperature of up to 1500° C. The yarn has a density of approximately 2.7 grams per cc and an elastic modulus of approximately 221 GPa ($32 \times 10^6$ psi). The fibers are chopped to paper length (e.g. about 1.0 to about 3.0 cm) by any conventional means and formed into sheets by conventional papermaking techniques. The silicon carbide fiber is present in the composite in an amount about 15% to about 50% by volume.

While the silicon carbide paper used in the samples of the present invention was isotropically laid, i.e. substantially equal number of fibers in-plane in every direction, the fiber laying can be favored in a particular in-plane direction in preparation of an article when it is known that such article will be receiving stress primarily in a single direction. However, to insure the improved properties of composites of the present invention such favored laying should not exceed about 90% of the total fiber laying, the fibers should be laid in-plane, and average fiber length should preferably be about 1 to about 3 cm.

The composites of the present invention are preferably formed by cutting the formed paper to the desired composite shape followed by papermaking binder removal, for example by solvent immersion or touching each ply to a bunsen burner flame to burn off the binder. The plies are next either dipped in a slurry of the glass or simply stacked with layers of powdered glass sufficient to substantially fill the spaces between the plies placed between each ply. The formed articles are then hot pressed at elevated temperature to form the composites. The processing parameters and composition of the material used can vary widely, depending on the ultimate use of the article. While it is not necessary to lay the plies in any particular direction, it has been found that the best strength properties appear to be obtained when each individual ply is laid up in the same direction, i.e. all plies are aligned during lay-up to keep colinear their original orientation with regard to the paper roll axis.

As can be seen from both the above processing description and the below cited example, the composites of the present invention are much easier to construct than the continuous fiber type composites. The particular care required when layng continuous fibers is not necessary here. Furthermore, it is known that composites containing continuously layed fibers can develop microcracks parallel to the fiber lengths when they are compressed which can result in channeling and fluid leakage. Because of the discontinuous orientation of the fibers of the present invention, this is not possible. It is also noteworthy that while continuous length silicon carbide fiber reinforced glass composites have tensile strain to failure values of the order of 0.1 to 0.3%, the discontinuous fiber reinforced composites of the present invention are believed to have values in excess of 0.6%.

Example

Silicon carbide fibers provided by Nippon Carbon Company as described above were chopped into about 2.0 cm lengths and formed into paper-like sheets (by International Paper Co.) containing about 5 to 10% by weight of a polyester binder which were then cut into individual pieces about 2.75 in. by 0.625 in. (6.99 cm by 1.59 cm). The binder was removed by holding each ply over a bunsen burner flame to burn off the binder. The plies were then dipped into a slurry of Corning 7740 borosilicate glass in propanol. An exemplary slip composition comprised 40 grams of powdered glass in 780 milliliters of propanol. Preferably the glass is ground so that 90% of it passes through a $-325$ mesh sieve. Thus, impregnated fiber pieces can be either air dried or dried with a radiant heat source such as a heating blower to remove solvent. Similarly, it is not necessary to cut the discontinuous fiber into the desired shape prior to forming the composite but it can be so formed after impregnation with the glass. The resulting impregnated papers were stacked about 50 layers deep in a die assembly for consolidation at elevated temperature. Hot pressing consolidation was performed at 1450° C. at a pressure of about 6.9 MPa ($1 \times 10^3$ psi) for about 60 minutes in inert atmosphere (vacuum and argon). The resultant composites contained about 44% by volume silicon carbide fibers, the remainder consisting of borosilicate glass. The samples were about 0.07 inch (0.178 cm) thick.

Superior strength, failure strain, in-plane isotropy (for isotropically laid fibers), fluid impermeability, fracture toughness, wear resistance, workability, machineability, and ease of fabrication are key properties which distinguish composites of the present invention from those of the prior art. Three-point bend strength tests were performed to demonstrate the superiority of these properties in the composites of the present invention. In the three-point bend tests, the specimen tested was 5.5 cm$\times$0.5 cm$\times$0.2 cm. All specimens were presurface ground with a diamond abrasive wheel to remove excess surface glass resulting from fabrication. For the three samples tested, flexural strength values of $36.9\times 10^3$ psi, $36.6\times 10^3$ psi, and $33.2\times 10^3$ psi (254 MPa, 252 MPa, and 228 MPa) and flexural modulus values of $11.4\times 10^6$ psi, $11.9\times 10^6$ psi, and $10.6\times 10^6$ psi (78 GPa, 82 GPa, and 73 GPa) were recorded. Furthermore, it is expected that these values will be maintained at elevated temperatures (e.g. in excess of 300° C. and even in excess of 500° C.) in an oxidizing atmosphere. This is a key advantage the composites of the present invention have over similarly constituted graphite fiber reinforced composites which would not maintain such strengths under such conditions. Note for example, column 8, line 60 et seq. of commonly assigned U.S. Pat. No. 4,263,367 which describes the problems encountered with discontinuous graphite fiber reinforced composites in thermal exposure testing in an oxidizing environment.

Although the invention has been shown and described with respect to detailed embodiments thereof, it should be understood by those skilled in the art that various changes and omissions in form and detail may be made therein without departing from the spirit and the scope of the invention.

We claim:

1. A silicon carbide fiber reinforced glass composite consisting essentially of about 15% to about 50% by volume high strength and high modulus of elasticity discontinuous silicon carbide fibers laid up in substantially in-plane random orientation in a glass matrix selected from the group consisting of borosilicate glass, high silica content glass, aluminosilicate glass, and mixtures thereof, so as to produce strength and fracture toughness properties greater than that of the glass matrix at temperatures in excess of 300° C. in an oxidizing environment.

2. The composite of claim 1 having a flexural strength greater than 10,000 psi (68.8 MPa) at temperatures in excess of 300° C. in an oxidizing environment.

3. The composite of claim 1 having a flexural strength greater than 20,000 psi (138 MPa) at temperatures in excess of 300° C. in an oxidizing environment.

4. The composite of claim 1 having a fracture toughness greater than 3 MPa/m$^{3/2}$ at temperatures in excess of 300° C. in an oxidizing environment.

5. The composite of claim 1 having a fracture toughness greater than 5 MPa/m$^{3/2}$ at temperatures in excess of 300° C. in an oxidizing environment.

6. The composite of claim 1 wherein the glass matrix is borosilicate glass.

7. The composite of claim 1 wherein the silicon carbide fiber is present in an amount about 15% to about 50% by volume.

8. A silicon carbide fiber reinforced glass composite consisting essentially of about 15% to about 50% by volume high strength, high modulus of elasticity silicon carbide fibers having an average length of about 1 cm to about 3 cm laid up in substantially in-plane random orientation in a low coefficient of thermal expansion glass matrix selected from the group consisting of borosilicate glass, high silica content glass, aluminosilicate glass and mixtures thereof, producing a composite with flexural strength and fracture toughness properties greater than the glass matrix at elevated temperatures.

* * * * *